No. 881,378. PATENTED MAR. 10, 1908.
O. M. COWLES.
STOVEPIPE JOINT.
APPLICATION FILED JULY 16, 1907.
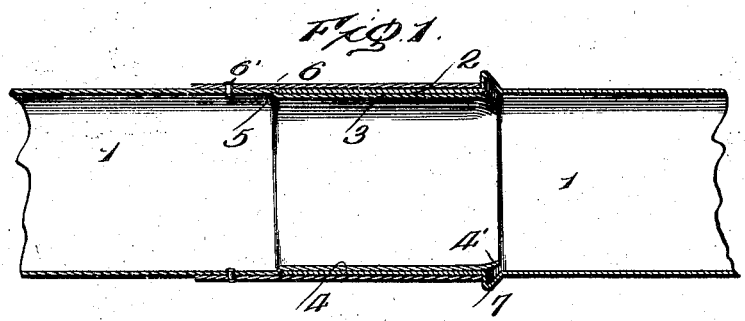
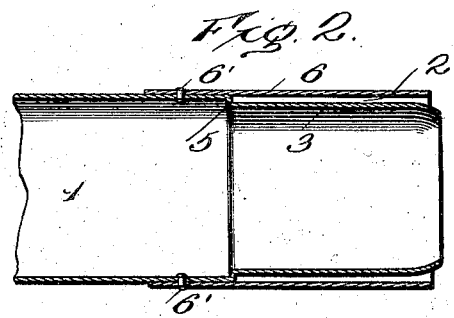
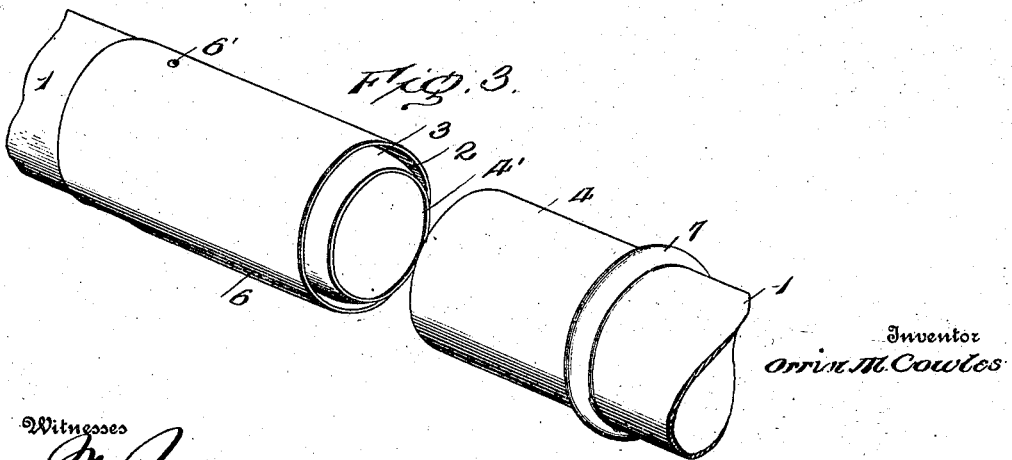
Inventor
Orrin M. Cowles
Witnesses
By
Attorneys

UNITED STATES PATENT OFFICE.

ORRIN M. COWLES, OF DEVILS LAKE, NORTH DAKOTA.

STOVEPIPE-JOINT.

No. 881,378.　　　Specification of Letters Patent.　　Patented March 10, 1908.

Application filed July 16, 1907.　Serial No. 383,999.

*To all whom it may concern:*

Be it known that I, ORRIN M. COWLES, citizen of the United States, residing at Devils Lake, in the county of Ramsey and State of North Dakota, have invented certain new and useful Improvements in Stovepipe-Joints, of which the following is a specification.

The present invention relates to a novel means for joining stove pipe sections and like members and aims to provide an improved joint which is peculiarly designed so as to effectively prevent any sagging of the pipes when disposed horizontally or accidental telescoping of the members when set up in a vertical position.

The invention also contemplates a novel construction in which the pipes are reinforced at the joints and in which the joints are absolutely fire proof.

For a full description of the invention and the merits thereof and also to acquire a knowledge of the details of construction and the means for effecting the result, reference is to be had to the following description and accompanying drawings, in which:

Figure 1 is a longitudinal sectional view through a pipe embodying the invention. Fig. 2 is a detail view of one of the pipe sections. Fig. 3 is a detached perspective view showing the pipe sections detached.

Corresponding and like parts are referred to in the following description and indicated in all the views of the drawings by the same reference characters.

The invention is illustrated as utilized for connecting a plurality of pipe sections 1, each of the sections being of like formation and being provided at one end with an annular socket 2 designed to receive the adjacent end of the next section. In the specific form of these pipe sections 1 it will be observed that one end thereof is reduced in cross section as indicated at 3, the said reduced portion being designed to fit within the end 4 of the next adjacent section and terminating in an annular shoulder 5. A sleeve 6 is designed to slip over the end of the pipe formed with the reduced portion 3, one of the edges of the sleeve extending beyond the shoulder 5 at the termination of the reduced portion and being riveted or otherwise rigidly secured to the pipe as indicated at 6, while the remaining portion of the sleeve is spaced from the reduced portion 3 of the pipe and coöperates therewith to form the annular socket 2. It may also be found desirable to contract the extremity 4 of the reduced portion 3 of the pipe in order to facilitate the entrance of the same into the end portion 4 of the adjacent pipe section and the assembling of the various sections for use. The end portion 4 of each of the pipe sections 1 terminates in an annular shoulder 7 having the upper face thereof beveled to deflect any moisture away from the pipe while the lower face constitutes a stop and engages the extremity of the sleeve 6. Where the pipe sections are formed of sheet metal as in the present instance this shoulder 7 may be conveniently pressed outwardly therefrom. In assembling the various pipe sections the ends 4 are thrust within the annular sockets 2 until the said ends abut against the annular shoulder 5 and the stop 7 engages the extremity of the sleeve 6. Attention is directed to the fact that with this construction three thicknesses of material are provided at the joint and that the latter is thereby reinforced against bending and is sufficiently rigid to hold the pipes in alinement with each other and prevent any sagging should they be disposed in a horizontal position. It will also be apparent that an extremely tight joint is provided which effectively prevents the escape of sparks or the like from the pipe.

Having thus described the invention, what is claimed as new is:

1. In a pipe joint, the combination of two pipe sections, the end of one of the sections being reduced and the outer end of the reduced portion being contracted while the inner end of the said reduced portion terminates in an annular shoulder, and a sleeve applied to the pipe section formed with the reduced end and coöperating with the latter to form an annular socket designed to receive an end of the opposite pipe section.

2. A pipe section provided with an annular shoulder adjacent one extremity thereof while the opposite end of the pipe section is reduced, the said reduced portion terminating in an annular shoulder, and a sleeve being applied to the end of the pipe section provided with the reduced portion and coöperating with the said reduced portion to form an annular socket for the purpose specified.

In testimony whereof I affix my signature in presence of two witnesses.

ORRIN M. COWLES. [L. S.]

Witnesses:
F. H. ROUTIER,
H. WHIPPLE.